United States Patent [19]

Haar et al.

[11] 4,369,387
[45] Jan. 18, 1983

[54] ELECTRIC DRIVE UNIT

[75] Inventors: Gerhard Haar, Leinfelden; Heinz Jakob, Bietigheim-Bissingen; Helmut Landa, Brackenheim-Hausen; Erwin Mayer, Kirchheim; Hans Prohaska, Bietigheim-Bissingen; Theodor Schneider, Freudental; Karl-Friedrich Schubert, Bietigheim-Bissingen; Martin Weber, Ingersheim, all of Fed. Rep. of Germany

[73] Assignee: ITT Industries, Inc., New York, N.Y.

[21] Appl. No.: 129,280

[22] Filed: Mar. 10, 1980

[30] Foreign Application Priority Data

Feb. 16, 1979 [DE] Fed. Rep. of Germany ....... 2905869

[51] Int. Cl.³ .............................................. H02K 7/10
[52] U.S. Cl. ..................................... 310/83; 310/75 R; 310/90; 74/427
[58] Field of Search ............... 310/83, 90, 75 R, 75 D, 310/89; 74/425, 427, 424.5, 424.6, 416

[56] References Cited

U.S. PATENT DOCUMENTS

| | | | |
|---|---|---|---|
| 790,875 | 5/1905 | Abrey | 74/427 |
| 2,422,933 | 6/1947 | Small | 310/83 |
| 2,639,394 | 5/1953 | Douglas | 310/83 |
| 3,121,396 | 2/1964 | Aabye | 310/90 |
| 3,143,897 | 8/1964 | Kohn | 310/89 |
| 3,152,488 | 10/1964 | Sergan | 74/427 |
| 3,196,301 | 7/1965 | Turk | 310/90 |
| 3,879,623 | 4/1975 | Mijake | 310/83 |
| 3,909,646 | 9/1975 | Haydon | 310/83 |
| 4,087,709 | 5/1978 | Haydon | 310/83 |

FOREIGN PATENT DOCUMENTS

| | | | |
|---|---|---|---|
| 2372998 | 6/1978 | France | 310/83 |
| 566498 | 9/1975 | Switzerland | 310/83 |

Primary Examiner—R. Skudy
Attorney, Agent, or Firm—James B. Raden; Donald J. Lenkszus

[57] ABSTRACT

An electric drive unit particularly adapted for actuating windshield wiper assemblies includes a motor having it's armature shaft carrying aportion having two oppositely pitched worm threads. Two worm gear wheels are disposed each on opposite sides of the threaded portion and in engagement therewith. The axes of rotation of the worm wheels are in parallel. Two spur wheels are each concentrically seated on a respective worm wheel. The spur wheels each engage a wheel having its axis of rotation located in a plane defined by the axes of rotation of the worm wheels. The toothed wheel is connected to a drive shaft.

19 Claims, 11 Drawing Figures

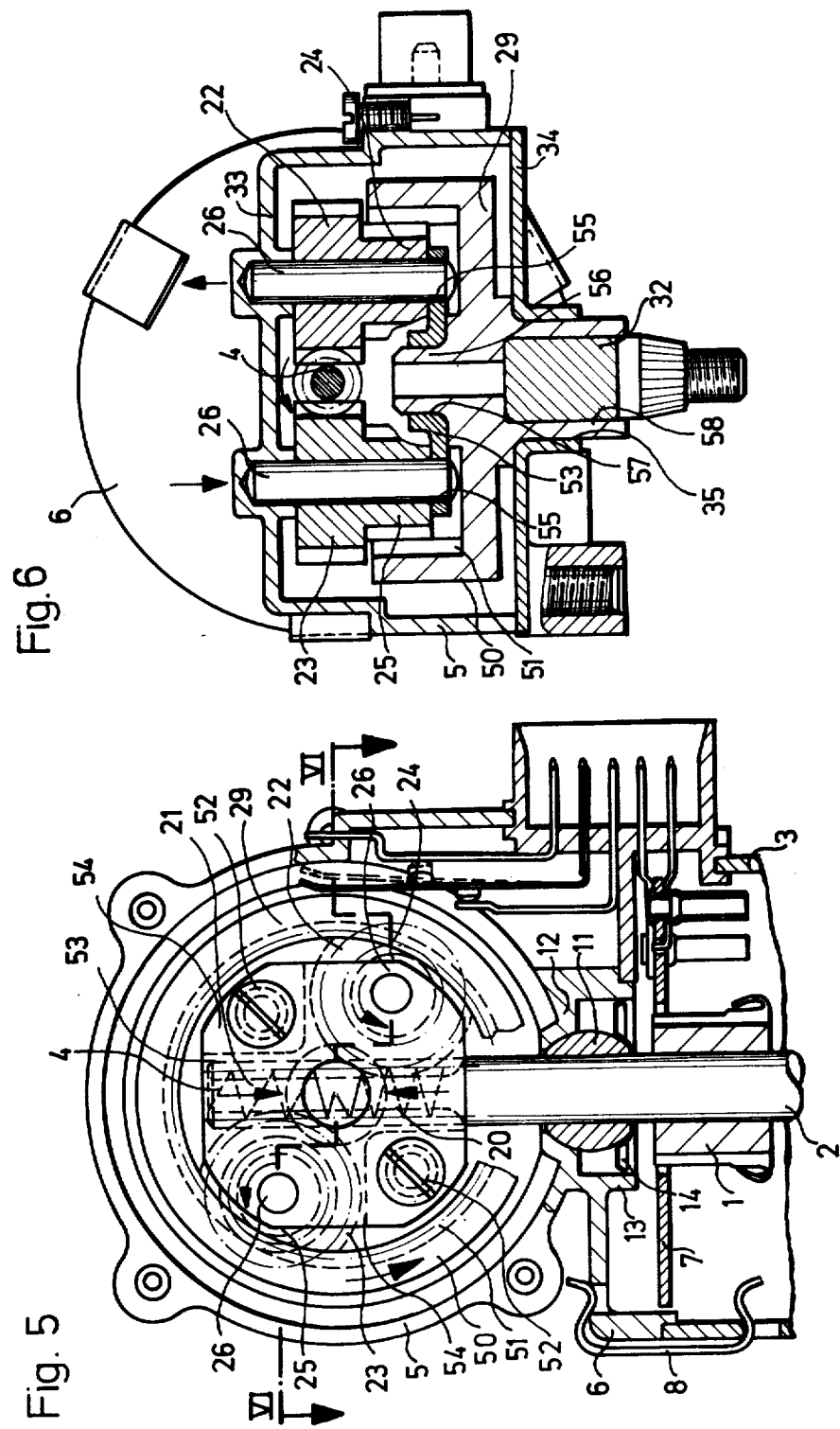

ELECTRIC DRIVE UNIT

BACKGROUND OF THE INVENTION

This invention relates to electric drive units, in general, and to windshield wiper motor and gear units, in particular. In one known windshield wiper motor a worm shaft driven by an electric motor mates with two worm wheels located on opposite sides of the worm shaft, so that bending of the shaft is avoided. The torque generated by the drive motor is divided, so that there are favourable conditions with respect to rolling pressure and tooth pressure of the worm wheels. The two worm wheels rotate in opposite directions, so that the axial thrusts they exert are added up. The axial thrusts are created because of the inertia of the toothed wheels, forces exerted on other moving parts of a windshield wiper installation and because of the friction forces between the parts moved relative to one another. Thereby the efficiency of the entire electric drive unit is diminished.

It is one object of the invention to provide an electric drive unit, especially a wiper motor having a high efficiency wherein the friction forces appearing between the gearing members are as small as possible.

GENERAL DESCRIPTION OF THE INVENTION

In accordance with the invention the two worm wheels on the worm shaft rotate in opposite directions. Therefore they exert axial thrusts on the armature shaft which are opposed to each other and therefore eliminate each other. If the thread pitches have the same values and the two worm wheels are of equal size, the axial thrusts are just compensated. By positioning the worm wheels on opposite sides of the worm shaft, bending of the worm shaft is avoided to a far extent. Thereby a staggered arrangement of the two worm wheels, which is necessary for worm threads arranged one after the other, may thereby be avoided.

It is possible to arrange the two worm threads in each other. Thereby the gear casing becomes very short and the two worm wheels can be located directly opposite on the gear axle. Because of the necessary gaps in the threads, the threads may act on the teeth of the worm wheels like a milling tool, so that the teeth can be destructed. Therefore it is more favourable to arrange the worm threads one after the other.

In single-threaded worm threads the reduction of the worm gear can be made big, whereas in multiple thread worm threads the efficiency is indeed improved, but only a smaller reduction is achieved, which above all as far as wiper motors with small speed of the driven shaft are concerned, would make the entire gearing more complicated than in cases in which the worm gear alone creates a big reduction.

If for the special use of the drive unit according to the invention a small reduction of the gearing is sufficient, the torques distributed on the two worm wheels can be combined by having the two worm wheels mate with a further toothed wheel which is fastened on a driven shaft.

To provide bigger reductions a further reduction stage may be inserted after the worm gearing. This reduction stage preferably co-prises two spur wheels. Each spur wheel being seated on a common axle with each worm wheel. A further toothed wheel is in gear with both spur wheels. This construction not only affects the efficiency favourably, but it provides too that the gearing is quite compact. In contrast to a known drive unit for transmission of the torques neither an intermediate gear wheel is necessary to reverse the direction of rotation of one of the two spur wheels nor does the further toothed wheel have to be toothed internally and externally like in another known motor.

In a further development of the invention the axis of rotation of the further toothed wheel is located outside of the plane defined by the axes of rotation of the worm wheels. Then the toothed wheel can have any desired size, so that the lever arm for the teeth acting on it is quite long. In a concrete embodiment the diameter of the toothed wheel will of course be limited by the size of the reduction and the desired size of the housing.

If the axis of rotation of the further toothed wheel is located in the plane defined by the axes of rotation, a particular size of the toothed wheel can indeed not be exceeded. But in contrast to the known electric drive unit it is possible to arrange the toothed wheel in such a way that the pressures the spur wheels exert on the driven shaft compensate mutually. Thereby the friction of this shaft is reduced, whereby the efficiency is improved further. If the toothed wheel is an external toothed wheel, it is located between the two spur wheels, so that the entire gearing only needs little space. A bigger lever arm on the toothed wheel is obtained for the spur wheels if, in a further development of the invention the toothed wheel is an internal toothed wheel on which the spur wheels are acting internally. The space needed for the gearing thereby becomes slightly bigger.

In order to obtain a proper guidance for the various gear wheel and avoid canting according to an advantageous further development of the invention, the gear wheels each are supported on two sides. As far as the internal toothed wheel is concerned, in which thus the axes of rotation of the worm wheels and spur wheels are located inside the outer circumference, this problem is solved by a bearing plate fixed to the housing and held in the interior of the internal toothed wheel.

Because the two worm wheels on both sides of the worm shaft are forming a bearing for said shaft the number of bearings can be reduced in comparison to bearings of known drive units. A single bearing between armature winding and worm toothing is provided for this purpose. But an immersion of the armature shaft into a bulge, which is preferably provided in an adjusting screw, is more advantageous. The bulge serves to compensate production tolerances, for example in a ball bearing serving as a seating. A motor of equal efficiency and equal starting torque being equipped with a bearing according to the invention can be produced more economically than known motors.

If a cap-shaped bearing is used, its lateral deviation should be prevented, so that a high efficiency is achieved. Therefore according to the invention the cap-shaped bearing is preferably held by a stable clamping disk.

If the clamping disk is formed as a ring whose outside diameter corresponds to the outside diameter of a standardized ball bearing, it is ensured that in a simple manner the same casing can be used for ball bearings as well as for cap-shaped bearings, whereby a safe seat is provided for both bearings. Thus the ball bearing can directly rest upon the housing with its entire outer surface, the cap-shaped bearing with half of its outer surface.

For a better lubrication of the contact surface between armature shaft and slide bearing the contact surface of the slide bearing is provided with lubricating grooves which even improve the efficiency, if the slide bearing consists of dry powdered metal.

SUMMARY OF THE INVENTION

This and other objects of the invention are accomplished in accordance with the invention by an electric drive unit having two oppositely pitched worm threads on a portion of the motor's armature shaft. Two worm wheels are disposed each on opposite sides of the shaft and engage the threaded portion thereof. The axes of rotation of the worm wheels are parallel to one another. Two spur wheels are each concentrically seated on a respective worm wheel. The spur wheels both engage a toothed wheel which has an axis of rotation located in a plane defined by the axes of rotation of the worm wheels. A driven shaft is connected to the toothed wheel to provide a mechanical output.

In one embodiment of the invention, the toothed wheel has teeth on its interior rim for engaging the spur wheel and the axes of rotation of the worm wheels are disposed within the circumference of the toothed wheel.

Further in accordance with one aspect of the invention, the worm wheels form a bearing for the armature shaft such that a single bearing on the armature shaft between the armature windings of the motor and the threaded portion may be provided.

In accordance with another aspect of the invention, an adjusting screw may be provided to compensate for movement of the armature shaft along its longitudinal axis.

In accordance with yet another aspect of the invention, the aforementioned bearing may be a slide bearing having lubricating grooves and the slide bearing may be formed of powdered metal.

BRIEF DESCRIPTION OF THE DRAWINGS

The invention may be better understood from a reading of the following description in conjunction with the drawings in which like reference numerals designate like parts and in which:

FIG. 5 is a gearing which has an internal toothed wheel as a driven wheel upon which toothed wheels are acting in diametral spots;

FIG. 6 is a section taken on the line VI—VI of FIG. 5;

DETAILED DESCRIPTION

Figure 1:
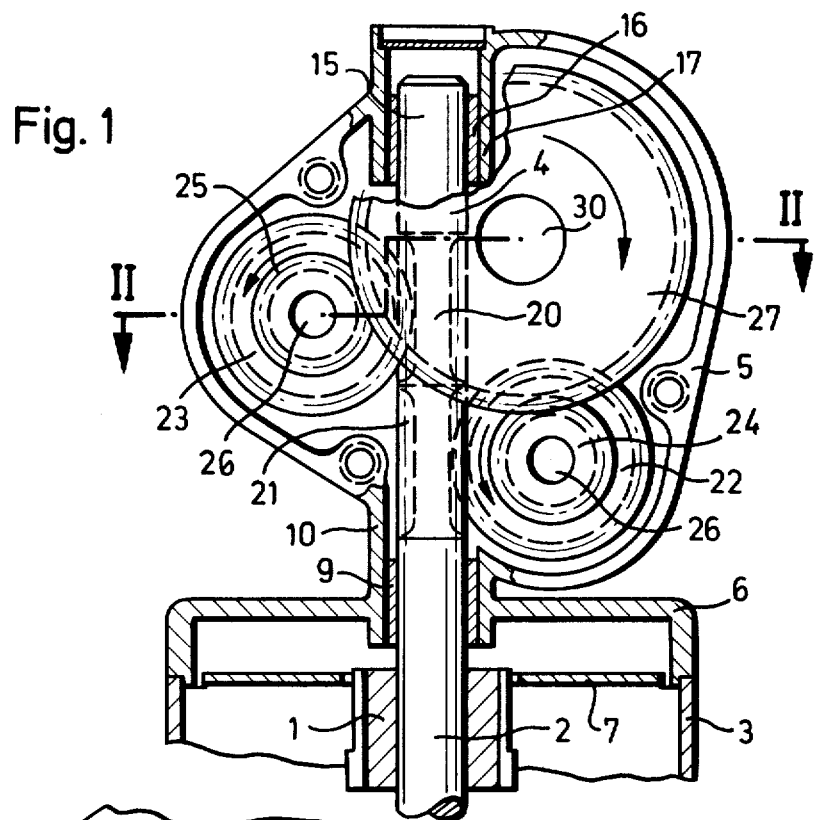
FIG. 1 is a gearing of an electric motor comprising two worm wheels on opposite sides of the worm shaft and a driven wheel which is supported outside of the plane defined by the axis of rotation of the worm wheels.
Figure 2:
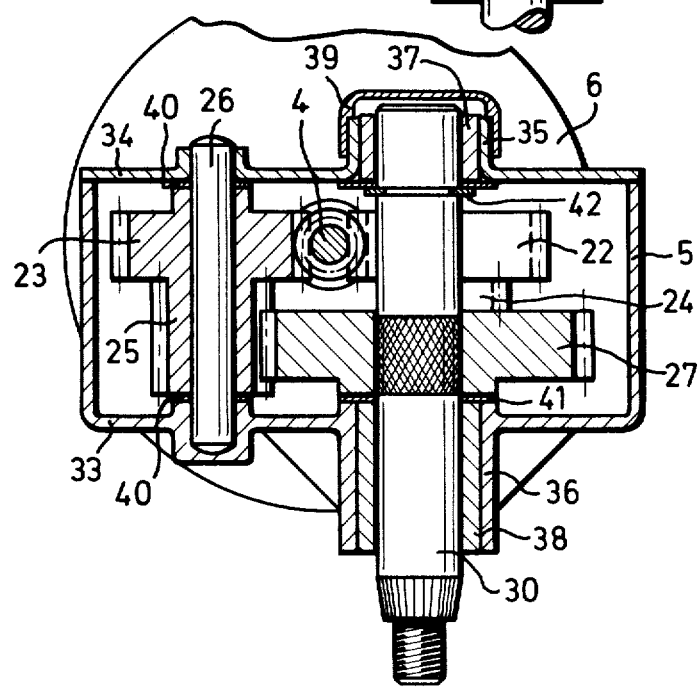
FIG. 2 is a section taken on the line II—II of FIG. 1.
Figure 3:
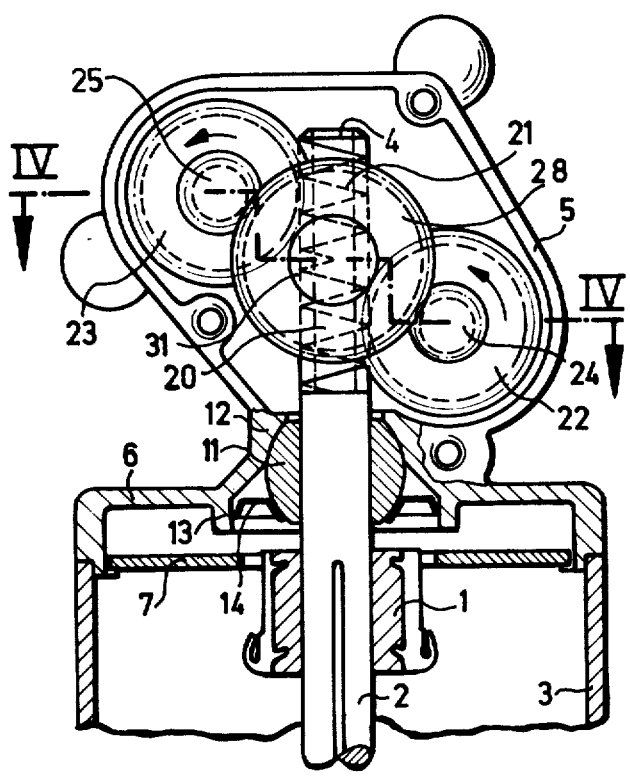
FIG. 3 is a gearing with an external toothed driven wheel whose axis of rotation is located in the plane defined by the axes of rotation of the worm wheels.

FIGS. 1 to 7 only show the parts of a wiper motor which are essential for describing the invention. This wiper motor consists of the actual electric motor and of a gearing. FIGS. 1, 3 and 5 show the collector 1 as well as the armature shaft 2 of the electric motor which are located in a motor housing 3. The armature shaft 2 is formed in one piece with the worm shaft 4 which projects into the gear housing 5. A cover 6 is provided on the holder 7 for the carbons not shown in the drawing and sliding on the collector 1. The cover is formed on the gear housing 5 on the side facing the gearing and closes the motor housing 3 with which it is connected in a suitable manner, for instance by several spring clips 8 according to FIG. 5. In the central area the cover 6 is formed in such a way that it can receive a bearing for the armature shaft 2 respectively for the worm shaft 4. In FIG. 1 this bearing is a cylindric bearing 9 which is located in a central bushing 10.

In FIG. 3 and FIG. 5 the bearings are cap-shaped bearings 11. Up to a particular height these are located in a cup 12 with a ball-shaped interior surface. On the other side the cap-shaped bearings 11 are secured by a clamping ring 14 in the cup 12 mounted between the flange 13 of the cover 6 and themselves.

In FIG. 1 the end 15 of the worm shaft 4 is also supported in an cylindrical bearing 16 which is inserted into a sleeve 17 of the gear casing 5.

The four embodiments according to FIGS. 1 to 7 have an armature shaft 4 which is provide with two worm threads 20 and 21 with opposed pitches of equal values. Each worm thread 20 and 21 is in gear with a worm wheel 22 or 23, so that the torque of the motor is divided. In order to prevent bending of the worm shaft towards one side the worm wheels 22 and 23 are arranged on different sides of the worm shaft 4. Thereby their points of action are to be located in longitudinal direction of the worm shaft 4 as near to each other as possible.

Figure 4:
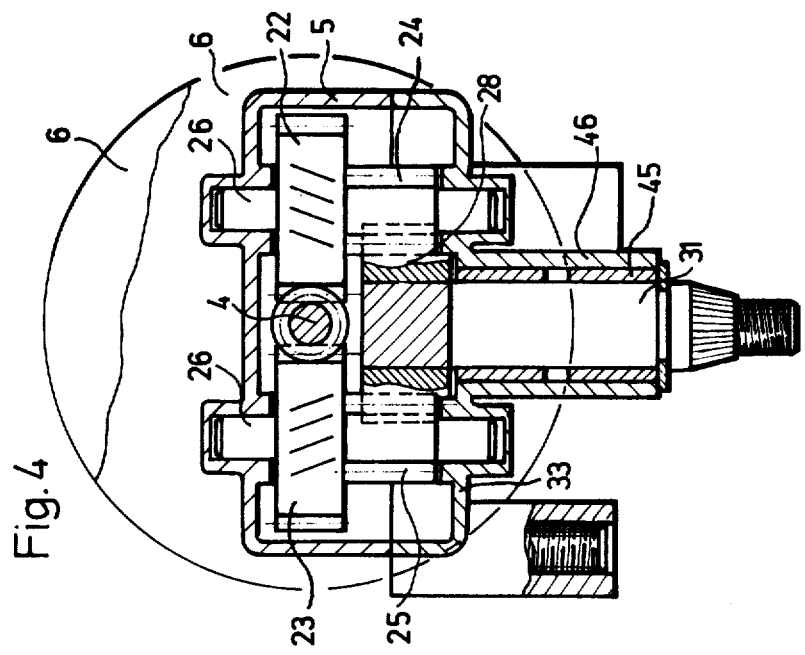
FIG. 4 is a section taken on the line IV—IV of FIG. 3.

Spur wheels 24 and 25 are integrally formed on each worm wheel 22 and 23 respectively. Both worm wheels 22 and 23 have the same number of teeth. Both spur wheels 24 and 25 have the same number of teeth. The number of teeth of the spur wheels 24 and 25 is smaller than that of the worm wheels 22 and 23. In other respects said wheels are built nearly alike. The two worm wheels 22 and 23 only differ in that their teeth are inclined from one of their faces to the other into different directions. This is indicated in FIG. 4. The different inclination is suggested by the opposed pitch of the two worm threads 20 and 21. Each unit of worm wheel and spur wheel is rotatably seated on an axle 26, which is supported on both sides of the unit.

Both spur wheels 24 and 25 rotate with the same angular velocity as the worm wheels 22 and 23 and mate with a common driven wheel 27, 28 or 29 which is connected with a driven shaft 30, 31, 32 in a manner protected against twisting. Thus the torques generated by the motor are combined again behind the spur wheels. Because the spur wheels 24 and 25 are similar, the axis of rotation of the driven wheels is located in a plane which extends vertically to the plane defined by the axes of rotation of the two worm wheels 22 and 23. Furthermore, the axis of rotation of the driven wheels is parallel to that of the worm wheels 22 and 23. Thereby a good engagement between the spur wheels and the respective driven wheel of the particular embodiments is ensured.

In the embodiment according to FIGS. 1 and 2 the axis of rotation of the driven wheel 27, which is externally toothed, is located outside of the plane defined by the axes of rotation of the two worm wheels 22 and 23. Thereby it is possible to make the diameter of the driven wheel very big and to provide it with many teeth, so that between the spur wheels 24 and 25 and the driven wheel 27 a large reduction can be achieved again. Because the axes of rotation and thus bearing shaft 26 of the units consisting of one worm wheel and one spur wheel each are located outside of the driven wheel 27, the bearing shaft 26 can be directly inserted into the gear casing 5, on the one side into the bottom 33 and on the other side into the cover 34.

In the same way the driven shaft 30, which is located beside the worm shaft 4, is conducted from the bottom 33, on which it extends to the outside, to the cover 34 of the gear casing 5. For a rotatable mounting of the shaft 30 in the bottom 33 as well as in the cover 34 one hollow-cylindrical recess 35 and 36 is formed, into which bearing bushings 37 and 38, respectively are placed. The driven shaft 30 is rotatably seated in the bearing bushings 37 and 38. In order to protect the one bearing a cap 39 is slipped over the hollow-cylindrical recess 35.

The rotatable parts are protected against axial play in the following manner. The constructional units consisting of a worm wheel and a spur wheel are approximately of the same height as the gear casing 5. They rest upon the housing 5 via two washers 40, so that a longitudinal displacement on the bearing shafts 26 is impossible. In one direction the driven shaft 30 is secured by the driven wheel 27 firmly connected with said shaft and resting upon the housing 5 by means of a washer 41 and into the other direction by the Seeger ring 42.

In the embodiment according to FIGS. 3 and 4 the driven wheel is rotatable round an axle which is located in the plane defined by the axes of rotation of the worm wheels 22 and 23 and exactly in the center between the axes of rotation of the worm wheels. Thus the spur wheels 24 and 25 act upon diametrical points on the driven wheel 28 which is externally toothed as in the first embodiment. Thus the bearing of this wheel is only loaded to a very small extent.

Because the axis of rotation of the driven wheel 28 penetrates the worm shaft 4, the driven shaft 31 cannot completely traverse the gear housing 5. Therefore it is individually mounted in a longer bearing bushing 45 which, compared to the recess of FIG. 2, is located in an elongated recess 46 at the bottom 33 of the gear casing 5. Just as in the first embodiment the rotatable parts are secured against axial displacement.

In the embodiment of FIGS. 3 and 4 a relatively small load acts on the bearing of the driven wheel. Additionally, the gear housing requires only a small space. This entails, however, the disadvantage that the driven wheel 28 must be relatively small, so that it can become difficult to achieve a big reduction. In the embodiments according to FIGS. 5 and 7 this disadvantage is at least partly eliminated and the particular advantages of the embodiment according to FIGS. 3 and 4 are not lost.

This is made possible in that the driven wheel 29 is developed as a cup-like internal toothed wheel which on the interior side of the wall 50 of the cup carries a ring gear 51. With this ring gear the spur wheels 24 and 25 are completely located within the internal toothed wheel 29. Thus the radius of the driven wheel 29 is larger than the radius of an external toothed wheel which is mounted in the same manner and mating with equal spur wheels.

Because of the internal toothed wheel 29 the bearing shafts 26 of the units consisting of a worm wheel and a driven wheel exactly like the driven shaft 32 can no longer completely traverse the height of the housing 5. In order to retain the seating of the bearing shaft 26 on both sides, a bearing plate 53 is fixed on two supports 54 rising from the bottom 33 (FIGS. 5 and 6). In the bearing plate 53 two bores 55 are provided for receiving the bearing shafts 26. The bearing plate 53, however, is appropriately used too to form a second bearing for the driven wheel 29. A cylindric pin 56 of the internal toothed wheel 29 is rotatably put into an opening 57 of the bearing plate 53. Because this opening is located between the two spur wheels 24 and 25 and little space is available there, the driven shaft 32, which has a bigger diameter than the pin, cannot be mounted therein. On the other side of the internal toothed wheel 29 a bushing 58 is formed which is pivoted in the recess 35 of the cover 34 and in which the driven shaft 32 is nonrotatably mounted.

Figure 7:
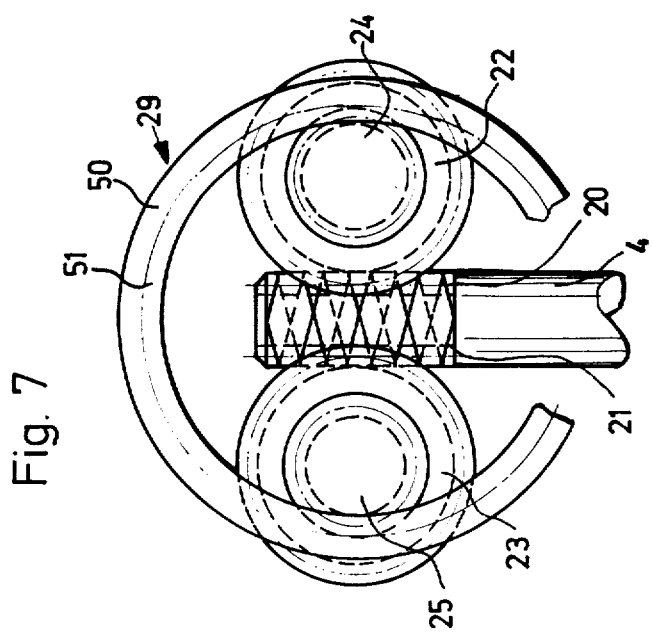
FIG. 7 is a gearing in which the worm threads are arranged in each other and the worm wheels are located directly opposite on the worm shaft.

The third embodiment shows a very compact gearing. This cannot only be concluded from the fact that only a small space is needed, but it is disclosed as well by advantages for the lubrication of the individual gearing parts. In FIG. 7 an embodiment is shown in a schematic view which is very similar to that of FIGS. 5 and 6. The difference is that in this embodiment the two opposed worm threads 20 and 21 are arranged on the same portion of the worm shaft. Therefore the worm wheels 22 and 23 can now be arranged directly opposite each other, so that even the slightest bending of the worm shaft is avoided.

Figure 8:
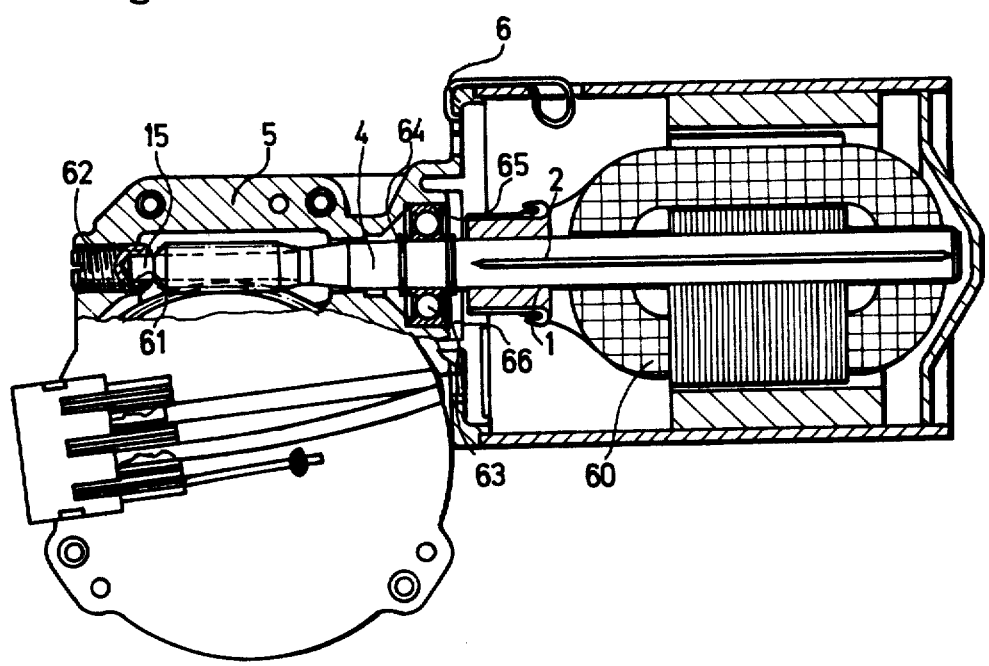
FIG. 8 is a partial section and a partial top view on a wiper motor with a ball bearing and an adjusting screw with internal thread.

FIG. 8 shows a wiper motor in which the armature shaft 2, forms the worm shaft 4 with the worm toothing. The armature shaft 2 is mounted between the armature winding 60 or more specifically between the collector 1 and the worm toothing. The end of shaft 2 facing the gearing 15 emmerges into the bore 61 of the adjusting screw 62. The wiper motor according to FIG. 8 has only one worm wheel. It can, however, be easily understood that such a mounting is particularly of advantage in embodiments with two worm wheels on different sides of a worm shaft 4 with two different threads, because then the lateral as well as the axial pressure on the worm shaft are avoided as far as possible.

The bearing is a ball bearing ring 63, which is held on the armature shaft 2 by press fit. On the lead-in side it is additionally secured by the Seeger ring 64. The external ring 65 of the ball bearing 63 is located on the wall of a cylindrical recess 66 of the cover. Movement of the ball bearing 63 from the recess 66 is prevented by slides inserted from outside. An axial play which may still exist can be compensated by the adjusting screw 62. Such a bearing does not only have a higher efficiency, but it is also cheaper than presently used armature bearings.

Figure 9:
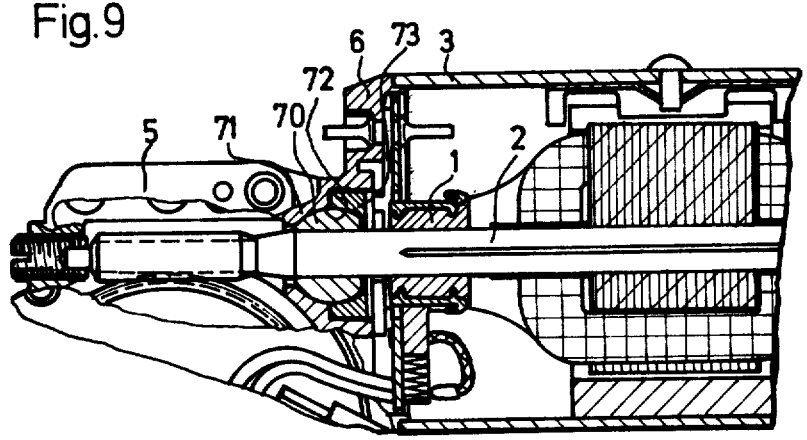
FIG. 9 is a partial section and a partial top view of a wiper motor with a stable clamping disk for a cap-shaped bearing.

If a cup-shaped bearing is used, it is advantageous to develop it according to the bearing of FIG. 9. The wiper motor which is shown there has an armature shaft 2 which is mounted between the collector 1 and the worm toothing in a cap-shaped bearing 70. The bearing is accommodated in the cover 6 of the gear casing 5 shutting the motor housing 3 on the side of the gearing. For this purpose a hemispherical cup 71 is formed on the cover 6. Cup 71 is continued by a cylindrical recess 72 with a larger diameter. One half of the spherical segment is located in the cup 71. The other half of the spherical segment projects into the space of the cylindrical recess 72. Between the spherical segment 70 and the ring-shaped lateral border of the recess 72 the plastic ring 73 is pressed. The plastic ring secures the spherical segment in the cup 71 and holds it laterally.

When the motor is loaded heavily the spherical segment cannot give way like a resilient clamping ring, so that the maximum torque is stabilized. Besides such a clamping disk has the advantage that its outside diameter can be adapted to that of standardized ball bearings, so that a ball bearing too can be inserted into the cylindrical recess 72 without a further change of the housing. Indeed this is also possible with known bearings using a clamping rings, but then—due to the larger diameter of the clamping ring which necessitates an enlargement of the cylindric recess in the top area—the contact surface of the ball bearing on the housing is considerably reduced, so that a firm seat is no longer ensured.

Figure 11:
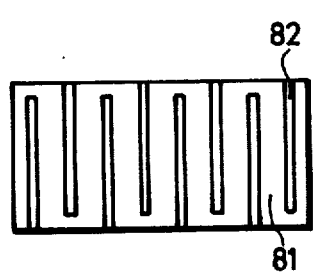
FIG. 11 an unwound slide bearing according to FIG. 10.
Figure 10:
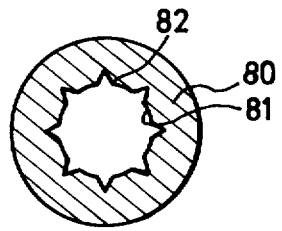
FIG. 10 is a section through a slide bearing with lubricating grooves in the contact surface.

FIGS. 10 and 11 show a slide bearing 80 made from a dry powdered metal whose contact surface 81 is provided with lubricating grooves 82. These lubricating grooves extend into longitudinal direction of a shaft mounted in said bearing and not shown in detail in the drawing. The greatest effect with respect to an improvement of the lubrication is achieved, when the lubricating grooves are extending across the entire length of the contact surface. In an application of such a bearing between gearing and motor, however, grease would be lost in that way. Therefore it is more favourable, when the lubricating grooves are shut towards one side as it is represented by FIG. 11 which shows an unwound slide bearings. Thereby neighbouring lubricating grooves are open on different sides, so that during the assembly the direction of insertion must not be considered.

What is claimed is:

1. An electric drive unit comprising:
   an electric motor comprising a housing, an armature winding in said housing, and an armature shaft extending from said housing;
   a gear housing connected to said motor housing;
   said armature shaft extending into said gear housing and having a first portion having first and second oppositely pitched worm threads;
   said gear housing including: a first gear means comprising a first worm gear wheel having a first rotational axis and disposed on one side of said first shaft portion and adapted to engage said first worm thread, a first spur wheel concentrically seated on said first worm gear and rotatable with said first worm gear about said first rotational axis; a second gear means comprising a second worm gear wheel having a second rotational axis and disposed on the opposite side of said first shaft portion and adapted to engage said second worm thread, a second spur wheel concentrically seated on said second worm gear and rotatable with said second worm gear about said second rotational axis; said first and second axes of rotation being parallel; a driven output shaft; a toothed wheel seated on said output shaft and adapted to engage said first and second spur wheels, said toothed wheel having a third axis of rotation located in a plane defined by said first and second axes of rotation.

2. An electric drive unit in accordance with claim 1 wherein said toothed wheel is an internal toothed wheel and said first and second axes of rotation are disposed within the circumference of said toothed wheel.

3. An electrical drive unit in accordance with claim 2 comprising a bearing plate connected to said gear housing and adapted to support said toothed wheel and said first and second spur wheels.

4. An electric drive unit in accordance with claim 3 wherein said toothed wheel comprises a bushing adapted to receive said driven shaft, and a cylindrical portion having a smaller diameter than said driven shaft, said bearing plate having an aperture adapted to receive said cylindrical portion.

5. An electric drive unit in accordance with claim 4 comprising a bearing supporting said armature shaft, said bearing being disposed between said first portion and said armature winding.

6. An electric drive unit in accordance with claim 5 wherein said gear housing includes a recess adapted to receive one end of said armature shaft.

7. An electric drive unit in accordance with claim 6 wherein said bearing is a ball bearing assembly.

8. An electric drive unit in accordance with claim 7 comprising an adjusting screw for compensating for axial plug of said armature shaft.

9. An electric drive unit in accordance with claim 8 wherein said adjusting screw is guided on said gear housing and is movable along the axial direction of said armature shaft, said adjusting screw includes said recess.

10. An electric drive unit in accordance with claim 7 wherein said bearing is a slide bearing.

11. An electric drive unit in accordance with claim 10 wherein said slide bearing is in the shape of a truncated sphere, said slide bearing having a central bore adapted to receive said armature shaft, said gear housing includes a recess adapted to receive said slide bearing, and said gear housing further comprises a clamping disk disposed within a portion of said recess to retain said slide bearing.

12. An electric drive unit in accordance with claim 11 wherein said clamping disk is ring-shaped.

13. An electric drive unit in accordance with claim 12 wherein said clamping disk comprises a plastic material.

14. An electric drive unit in accordance with claim 12 wherein said slide bearing receiving recess includes a first recess portion in the shape of an approximately hemispherical cup adapted to receive said slide bearing and a second portion having a contour adapted to match the contour of said clamping disk.

15. An electric drive unit in accordance with claim 14 wherein the wall of said bore includes a plurality of lubricating grooves.

16. An electric drive unit in accordance with claim 15 wherein said lubricating grooves extend in a direction parallel to said armature shaft.

17. An electric drive unit in accordance with claim 16 wherein each of said plurality of lubricating grooves extends longitudinally across said wall.

18. An electric drive unit in accordance with claim 16 wherein each of said plurality of lubricating grooves extends longitudinally over a portion of said wall.

19. An electric drive unit in accordance with claims 17 or 18 wherein said slide bearing comprises dry powdered metal.

* * * * *